Jan. 7, 1941.                    E. W. GLACY                    2,228,007
                              SIGNALING DEVICE
                           Filed Dec. 16, 1937

INVENTOR.
EDWARD W. GLACY,
BY
HIS ATTORNEY.

Patented Jan. 7, 1941

2,228,007

UNITED STATES PATENT OFFICE 2,228,007

SIGNALING DEVICE

Edward W. Glacy, Bristol, Conn., assignor to General Motors Corporation, Detroit, Mich., a corporation of Delaware Application December 16, 1937, Serial No. 180,175

12 Claims. (Cl. 200—52)

This invention relates to signaling devices especially those for velocipedes and the like and more particularly to a stop light responsive to the braking operation of a bicycle coaster brake.

Coaster brake equipped bicycles may be stopped very quickly and heretofore a cyclist has been unable to clearly indicate his intention of applying a brake except by a hand signal necessitating the removal of one of his hands from the handle bar. The application of a bicycle brake tends to throw the rider forwardly, and this shift of balance is resisted by bracing his hands on the handle bar. The removal of a hand from the handle bar not only endangers the safety of the rider, but also may result in injury to others near him.

It is therefore an aim of this invention to provide a signaling device for velocipedes and the like which operates in response to the application of the velocipede's brake mechanism and permits the rider to keep both hands on the handle bar.

A further object is to provide a stop light control mechanism forming part of a coaster brake and which is of simple construction, easy to assemble, reliable in operation and responsive to engagement and disengagement of the brake.

To these ends, and also to improve generally upon devices of the character indicated, the invention consists in the various matters hereinafter described and claimed.

In the illustrated embodiment of my invention there is a bicycle signaling device, such as a lamp S, which automatically indicates a brake operation. A control switch, generally designated at A and forming a part of a coaster brake on the bicycle, responds to the brake mechanism to connect the lamp in circuit with a source of power such as a battery B, for automatically lighting the lamp whenever the brake is applied.

Figure 1:
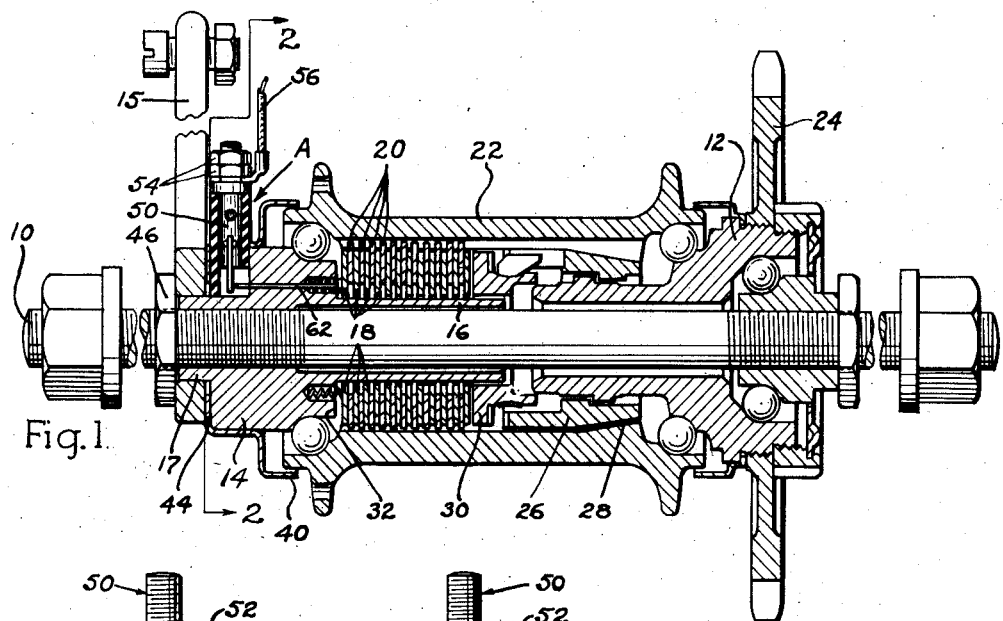
Fig. 1 is a longitudinal sectional view of a coaster brake including my invention.
Figures 2, 3, 4:
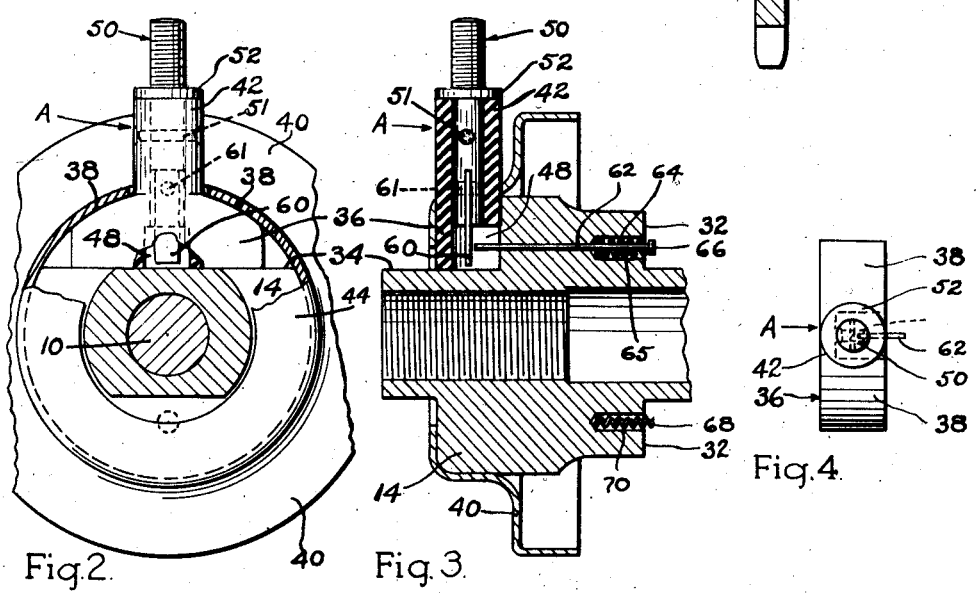
Fig. 2 is an enlarged fragmentary end view of the coaster brake taken substantially along the line 2—2 of Fig. 1.
Fig. 3 is an enlarged fragmentary view of the left end of Fig. 1 to better illustrate the control switch.
Fig. 4 is a plan view of the control switch.
Figure 5:
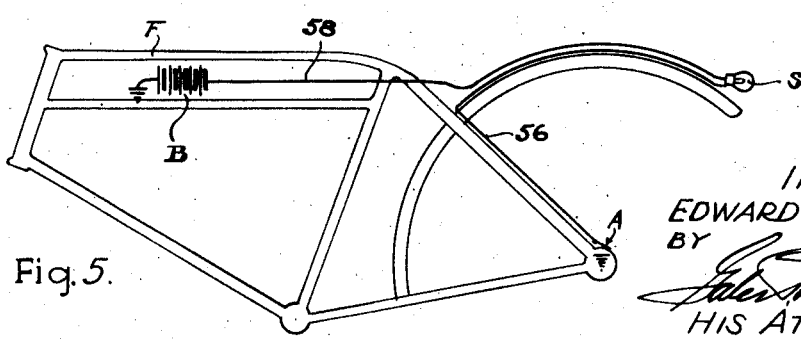
Fig. 5 is a diagrammatic view showing the electrical circuit.

In this illustrated embodiment, the coaster brake, of well-known construction and shown, for example, by the patent to Delaval-Crow, No. 2,054,583, of September 15, 1936, has the axle 10 non-rotatably clamped in the bicycle frame F and supporting the rotatable driver-sleeve 12 and the stationary brake anchor 14 on whose reduced sleeve 16 are mounted the non-rotatable but longitudinally slidable brake discs 18 that alternate with the cooperating longitudinally slidable brake discs 20 splined to the wheel hub 22; that hub being rotatably supported upon the sleeve 12 and anchor 14 and adapted to be driven when forward rotation of the driver-carried sprocket 24 moves the laterally shiftable threaded connector 26 into engagement with the hub seat 28; being adapted to coast when that connector occupies an intermediate position as indicated in Fig. 1; and being adapted to be braked when backward sprocket rotation forces the connector to the left as the parts are here illustrated, and thus clamps the brake discs against each other and between the non-rotatable brake actuator 30 and the shoulder 32 of the brake anchor 14, all as more fully described and shown in the aforesaid patent to Delaval-Crow.

The brake anchor 14, in accordance with usual practice, is secured to the bicycle through the anchor arm 15 which engages a non-circular extension 17. However, in my illustrated structure the body portion of the anchor 14 is cut away in continuation of the upper face of the beforementioned extension 17 to provide a shoulder or base 34 for the support of a switch box of insulating material. My switch box is shown as embodying a main block 36 having its upper portion forming spaced faces 38 that are substantially flush with, and have the curvature of the periphery of the before-mentioned cylindrical brake anchor 14, so that the switch block 36 snugly fits within the dust cap 40 which is apertured to receive a tubular stem 42 rising from the block 36, and the reduced flanged portion 44 of the cap is clamped against the block 36 and the anchor 14 by a nut 46 on the axle 10 to rigidly but removably secure the cap and the block in position.

A chamber 48 in the lower end of the block 36 communicates with the bore through the stem 42 which receives a terminal post 50 secured in position as by a rivet 51 and provided with a stem-engaging flange 52 above which rises a threaded end supporting the nuts 54 for securing a connection wire 56 the other end of which connects with one terminal of the lamp S. The other lamp terminal is connected by a wire 58 to a suitable source of electrical energy such as the battery B grounded to the bicycle frame which, as will be later described, forms a connection through the control switch A to the lamp S so that the lamp is turned on and off in response to the operation of the brake. The lower end of the terminal post 50 is slotted to tightly receive the upper end of a substantially vertically depending flat spring contact 60 also secured to the post 50 as by a rivet 61. The lower end of the spring contact 60 is free to flex within the chamber 43 and normally lies out of electrical contact with the coaster brake parts whose metallic members contact with each other and with the metallic bicycle frame to provide an electrical circuit.

A plunger 62 grounded to the frame as through the brake anchor 14 and axle 10 is slidably mounted in the brake anchor for movement into and out of electrical contact with the spring contact 60 to open and close the lamp circuit. A coiled spring 64 received within a counter bore 65 in the anchor 14 and engaging a head 66 on the plunger urges the plunger away from engagement with the contact 60 and into engagement with the end brake disc adjacent the shoulder 32. This coiled spring also aids in maintaining a positive grounded connection between the plunger and the brake anchor. I preferably employ one or more additional coiled springs 68 received within the bores 70 in the anchor 14 and engageable with the end disc in co-operation with the spring-urged plunger to uniformly and yieldingly push the end disc away from the shoulder 32 during driving and coasting operations. These coiled springs compress sufficiently during a braking operation so that the end disc may engage the shoulder 32.

When the brake is applied, the brake discs are initially shifted to the left as viewed in Fig. 1 and this movement of the end disc shifts the plunger 62 into electrical contact with the spring contact 60 closing the circuit and lighting the lamp S just prior to engagement of this end disc with the shoulder 32 to provide a warning signal shortly before and during the ensuing brake application. Further movement of this end disc into shoulder engagement shifts the head 66 and the coiled springs completely within the anchor 14 and this additional movement of the plunger results in a deflection of the spring contact 60 sufficient to assure positive electrical contact in the control switch A. The control switch remains closed and the lamp S stays lighted until the brake is released at which time the springs 64 and 68 cooperatively urge the brake discs to their driving or coasting position and the plunger is shifted out of contact with the spring contact 60 to turn off the lamp S.

My invention may also be quickly and easily applied to a standard type of coaster brake by replacing the brake anchor and associated dust guard with the brake anchor 14, the dust guard 40 and my control switch A. The battery B may be suitably mounted in a case on the bicycle frame and the lamp S may be fastened in any desired position, as, for example, to the rear of the mud guard for the rear bicycle wheel.

I claim:

1. In a device of the character indicated, a wheel hub, a brake mechanism in the hub, a brake disc in said mechanism axially movable into and out of a braking position, and a signaling device responsive to the movement of said disc before the disc reaches a braking position; substantially as described.

2. In a device of the character indicated, a wheel hub, a brake mechanism in the hub, a brake disc in said mechanism movable into and out of a braking position, yieldable means urging the disc out of braking position, means to shift the disc into braking position, and a signaling device responsive to said disc movement for indicating when the brake is applied; substantially as described.

3. A device of the character indicated comprising a wheel hub, a brake therefore movable to and from a braking position, a brake anchor, an electrical switch including a switch member movable in the anchor and responsive to said brake movement prior to and during the ensuing braking operation, and means removably securing the switch on said brake anchor; substantially as described.

4. In a device of the character indicated, a rotatable wheel hub, an axle therefor, a brake anchor supported by the axle, brake mechanism for the hub and supported by the axle, a signaling means supported on the anchor, said means having a switch contact operably movable in the anchor and actuated by the brake mechanism, and a member engaging the anchor and removably securing said signaling means in position; substantially as described.

5. In a device of the character indicated, a brake anchor having a passage therein, and a signaling means movable in said passage to and from a signaling position; substantially as described.

6. In a device of the character indicated, a brake anchor having a seat formed thereon and also having a passage communicating with the seat, signaling means supported by said seat, and a co-operating signaling element movable in said passage; substantially as described.

7. In a device of the character indicated, a brake anchor having a seat formed thereon and also provided with a passage opening at said seat, a switch box mounted on the seat and having a signaling element, and a co-operating signaling element slidable in said passage; substantially as described.

8. In a device of the character indicated, a rotatable wheel hub, a brake member for said hub and movable to and from a braking position, a non-rotatable brake anchor having a shoulder, a switch box seated on said shoulder, switching mechanism in the box and anchor responsive to the brake member movement, and a cap member overlying the anchor and said box to secure the box in position; substantially as described.

9. In a device of the character indicated, a supporting member having a portion cut away to provide a seat thereon, a switch box upon the seat and having an outwardly projecting stem portion, and a cap extending about said member and box and having an opening receiving said stem portion; substantially as described.

10. In a device of the character indicated, a supporting member having a seat thereon provided with angularly disposed faces, a switch box supported by the seat and having a chamber opening upon said faces, the supporting member being provided with a passage opening into said chamber, a switch element carried by the switch box in said chamber, and a co-operating switch element slidable in said passage; substantially as described.

11. In a device of the character indicated, a rotatable wheel hub, a brake therefor having a movable member, a brake anchor having a shoulder, a hollow switch box seated on said shoulder, a spring switch contact in the box, a plunger movably supported in the anchor and engageable with said contact and with said movable member, and a cap overlying the anchor and the box to fasten the box in position; substantially as described.

12. In a device of the character indicated, a wheel hub, a brake member in the hub and movable to and from a braking position, a brake anchor having a cutaway portion forming a seat, a hollow switch box on said seat and having a pair of spaced faces and an intervening outwardly projecting stem, a switch contact supported at one end within the stem and projecting into said hollow box portion, a slidable plunger in the anchor engageable with said brake member at one end and with said contact at the other end, yieldable means urging the plunger out of engagement with said contact and towards said brake member, and a cap removably overlying said faces and said anchor to demountably secure the switch box on said seat; substantially as described.

EDWARD W. GLACY.